(12) United States Patent
Arab-Sadeghabadi et al.

(10) Patent No.: US 6,196,553 B1
(45) Date of Patent: Mar. 6, 2001

(54) FIBER OPTICAL CONNECTOR SEAL

(75) Inventors: Akbar Arab-Sadeghabadi, Simi Valley; Agop H. Cherbettchian, Santa Monica, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/126,673

(22) Filed: Jul. 30, 1998

(51) Int. Cl.[7] ............................................ F16J 15/04
(52) U.S. Cl. ..................... 277/603; 277/619; 277/621; 277/919; 174/77 R
(58) Field of Search ........................... 277/603, 616, 277/619, 620, 621, 919; 174/77 R, 74, 93; 439/271, 274, 275

(56) References Cited

U.S. PATENT DOCUMENTS

| | | | | |
|---|---|---|---|---|
| 2,605,315 | * | 7/1952 | Hargett | 439/271 |
| 4,553,807 | * | 11/1985 | Cane | 339/94 R |
| 5,301,959 | * | 4/1994 | Gould | 277/184 |
| 5,718,435 | * | 2/1998 | Weehut | 277/1 |

* cited by examiner

Primary Examiner—Anthony Knight
Assistant Examiner—Enoch Peavey
(74) Attorney, Agent, or Firm—Elliott N. Kramsky

(57) ABSTRACT

A seal assembly for a multichannel fiber optic connector. The seal is engaged to the portion of the connector mounted within a receptacle housing that may be mounted to the turret of the hull penetrator of a vessel. An elongated symmetrical seal housing is sealably secured with the receptacle at the back of the connector. A retainer member having a plurality of channels therethrough is held at a rear portion of the seal housing by an annular shoulder thereof. A plurality of elongated standoff spacers define a strain relief chamber between the rear of the connector and the retainer member. O-rings seal individual optical fibers passing through the channels of the retainer member, which is sealably secured to the seal housing.

17 Claims, 2 Drawing Sheets

FIBER OPTICAL CONNECTOR SEAL

This invention is made under government contract number N66604-95-C-0004.

BACKGROUND

1. Field of the Invention

The present invention relates to fiber optic connectors. More particularly, the invention pertains to a seal for preventing the infiltration of fluid between the exterior and the interior of a vessel through a connector in the event that connection is broken between the ship-mounted receptacle and a mating plug.

2. Description of the Prior Art

U.S. Pat. Ser. No. 5,590,229 of Goldman et al. covering "Multichannel Fiber Optic Connector" and property of the assignee herein presents an example of a connector for optically coupling the on-board (e.g. laser, photodetector and processing electronics) and exterior (i.e., hydrophones) elements of a hydrophone optical sensor system. Typically, the female housing ("receptacle") of such a connector is fixed to the turret of a so-called "hull penetrator" of the vessel. The male housing ("plug") may be fixed to the proximate end of a hose-like casing containing a plurality of end-to-end hydrophones in the case of a towed array or to each of the ends of an optical cable for subsequent interconnection to a receptacle that is mounted to an acoustic module. In the latter case, the module is, in turn, fixed to the hull of the vessel. Multiple optical fibers are required for communication of information between vessel and sensors. For example, a seven (7) hydrophone arrangement requires fifteen (15) associated optical fibers and, thus, the maintenance of a like number of reliable optical contacts at the plug-to-receptacle interface.

In the patented connector, multiple optical fibers with ferrule terminations are spring-loaded within a plurality of aligned internal channels within each half of the connector. The faces of aligned ferrule-mounted fibers abut one another at one end while the fibers exit the opposed end of each channel.

As mentioned above, a connector of the above type might contain fifteen (or more) internal channel passageways. Each of such passageways poses a potential fluid infiltration path should the submerged connector become open or uncoupled while in use. Unintentional uncoupling of the receptacle from the plug of the connector can occur during use. The greater the depth of the turret-mounted receptacle below the surface at the time of decoupling, the higher the pressure differential between the inboard and outboard ends of the multiple connector channels for exerting a fluid infiltration force.

Recognition of the danger posed by the mounting of a connector of the above type to the turret of a hull penetrator has mandated the provision of a sealing means in the prior art. Typically, the seal has been produced by filling the inboard end or tail of the receptacle with an appropriate non-porous water-resistant compound such as a polyurethane. While a superficially-simple solution, this approach to the problem of infiltration can be risky as it is both material and process dependent. One must be aware of the shelf life of the material which will vary in accordance with the skill and accuracy with which the (generally two element) compound has been mixed. The process of filling the end of the receptacle involves the careful preparation of internal surfaces that must hold the seal against the frequently-quite-significant potential fluid infiltration forces.

Once affixed, such a seal effectively permanently fixes the configuration of the connector. Should replacement of a fiber or a ferrule be required, a complete replacement of the involved half of the connector is required. Thus, in the long run, such a prior art seal can involve significant cost beyond that suggested by the apparent simplicity of the concept.

SUMMARY OF THE INVENTION

The seal assembly of the invention is designed to fit within a housing member and comprises a retainer member wedged against the wall of the housing member, the retainer member having channels for accommodating the optical fibers therethrough. A cover plate is provided in association with the retainer member, and one or more standoff spacers properly secures and spaces the retainer member from other structures within the housing member. Preferably, the retainer member includes an annular O-ring channel in which an O-ring is seated, so as to provide an improved seal between the retainer member and the housing member.

In one aspect, the retainer member includes a back wall and a front wall, wherein the front wall includes, about the channel passing through the retainer member, an annular O-ring recess which receives an O-ring. This O-ring surrounds the optical fiber as it emerges from the retainer member, providing a seal at this critical point in the path of the optical fiber. Preferably, the cover plate includes apertures which register with the channels when the cover plate is located adjacent the retainer member, the apertures permitting passage therethrough of the optical fiber. That part of the cover plate surrounding the aperture encases the O-ring in the annular O-ring recess, helping to ensure an improved seal between the retainer member and the optical fiber.

The retainer member with its associated O-rings has the important function of blocking water passage between the housing member in which the retainer member is contained and the retainer member itself. It also provides a housing and support: for the O-rings surrounding the optical fibers as they emerge from the channel in the retainer member, an important point of sealing to prevent water flooding through the channel and into adjacent components. The retainer member further provides an anchor to which the standoff spacer is secured, and since the standoff spacer is also secured at its other end to other structures within the housing, an appropriate spacing between the retainer member and other structures within the housing is defined and maintained. The retainer receptacle may be made of stainless steel, or of an alloy, such as "K-MONEL".

The cover plate has, as one of its most important functions, the ability to keep the O-rings located in the O-ring annular recess of the retainer member in position around the optical fibers, providing a critical point of sealing along the path followed by the optical fiber.

The standoff spacer, appropriately bolted to the cover plate and retainer member, ensures that the cover plate remains in place. The standoff spacer also creates a space, or chamber, between the cover plate of the seal assembly and the structure containing the ferrules. This space constitutes an air-gap in which the optical fibers are located, without being under any tension, and the chamber therefore operates as a fiber-strain relief area. Furthermore, the standoff spacer attaches the remaining portions of the seal assembly, namely, the retainer member and the cover plate, to the structure within the housing holding the ferrules. In a preferred embodiment, one end of the standoff spacer is screwed or bolted to the back plate, which is attached to the ferrule holder. With the seal assembly bolted to the ferrule holder assembly, the whole structure can be slideably inserted into and removed from the housing, with the proper spacing and component configuration already defined and maintained prior to insertion in the housing. The ability for the entire assembly to be removed and replaced within the body as one piece provides an important advantage in that ease of access for reworking or repairing components within the housing member is facilitated, reducing down-time for such repairs and simplifying the repair process itself.

The preceding and other features and advantages of the present invention will become further apparent from the detailed description that follows. Such description is accompanied by a set of drawing figures. Numerals of the drawing figures, corresponding to those of the written description, point to the features of the invention. Like numerals refer to like features throughout both the written description and the drawing figures.

DETAILED DESCRIPTION OF THE PREFERRED EMBODIMENT

Figure 1:
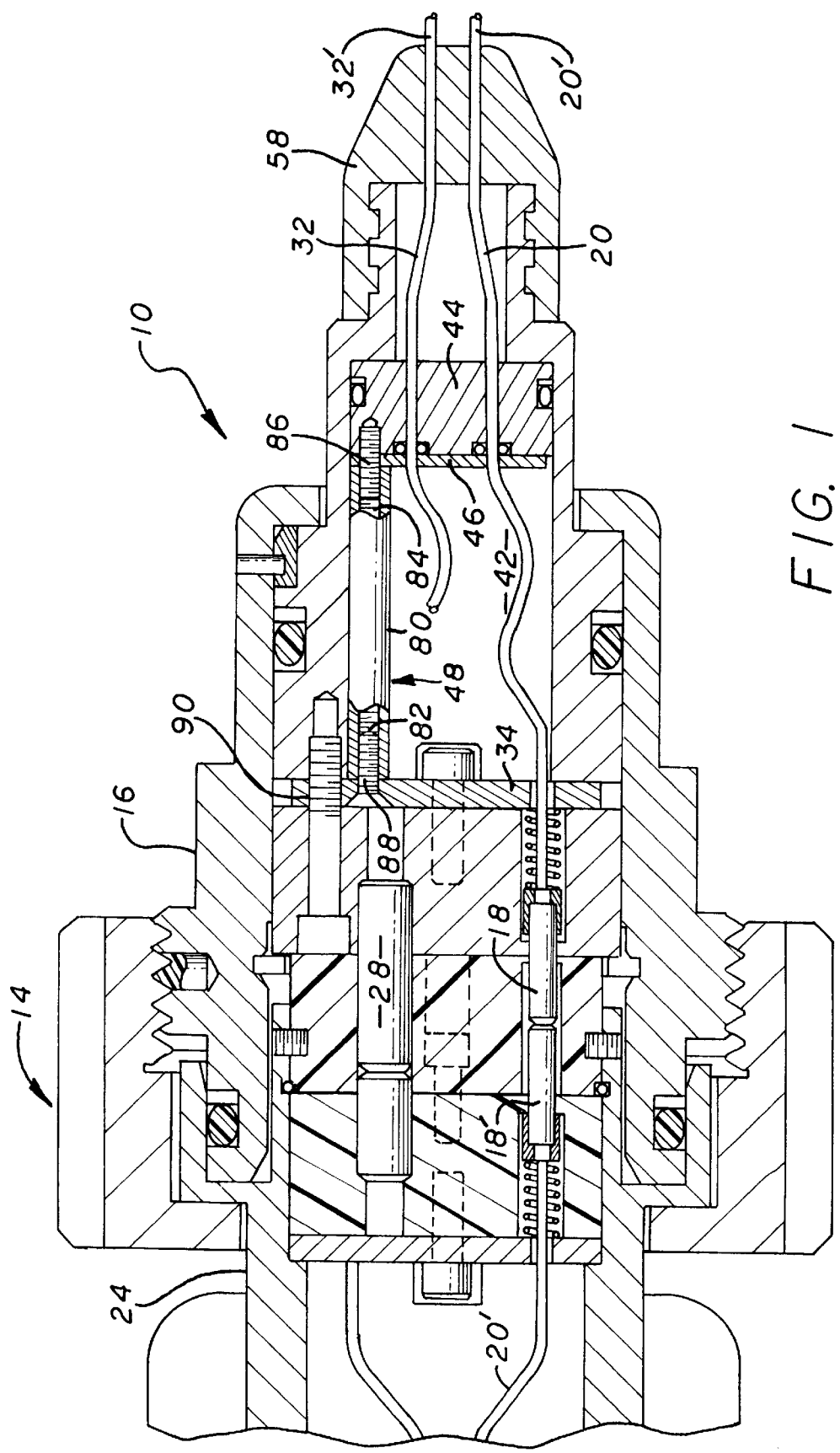
FIG. 1 is a side sectional view of a multichannel fiber optic connector including a seal assembly in accordance with the invention.
Figure 2:
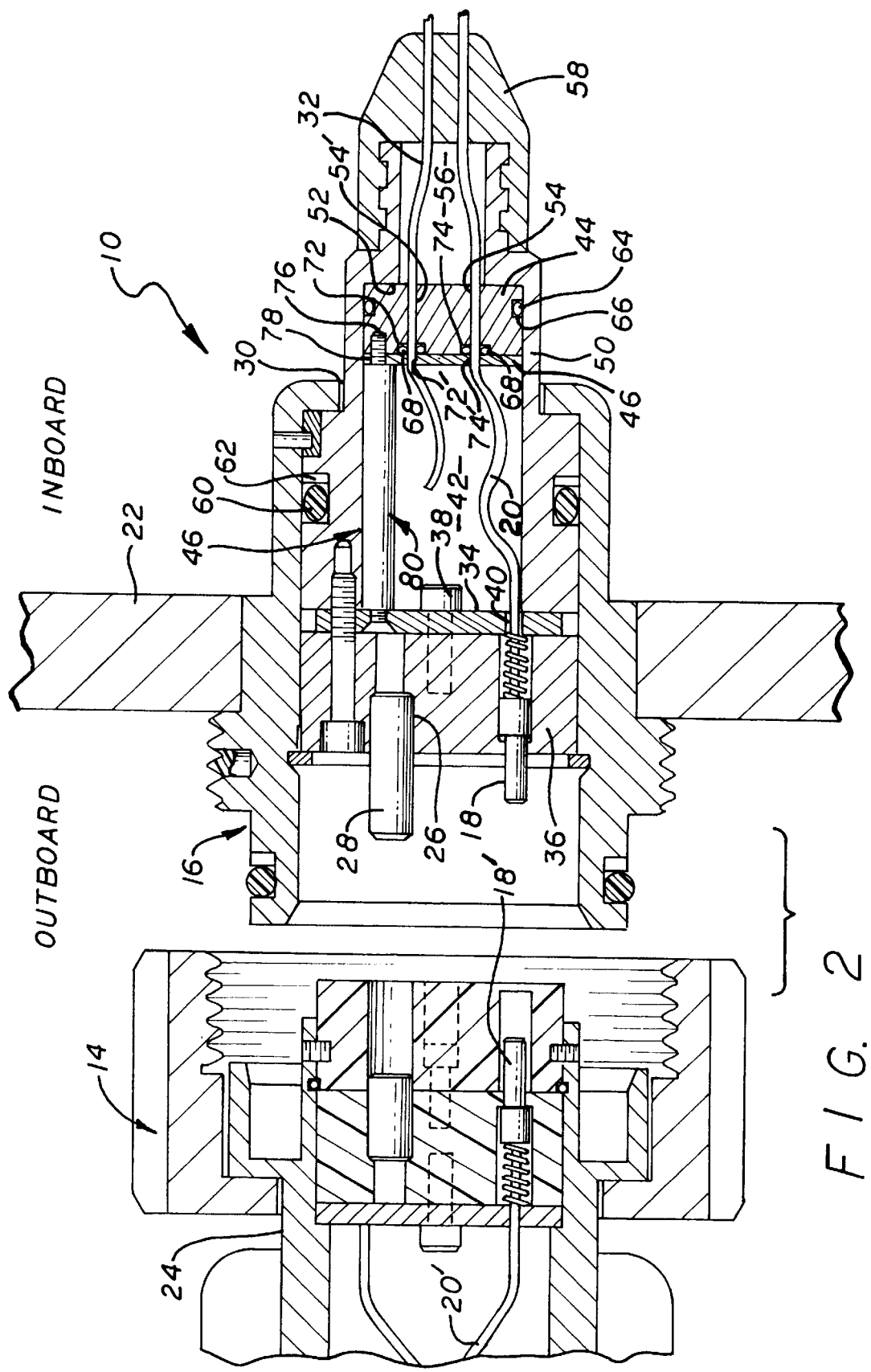
FIG. 2 is a side sectional view of the multichannel fiber optic connector of the preceding figure wherein the receptacle housing is fixed to the turret of a vessel's hull penetrator and disengaged from the plug housing for illustrating the manner in which the seal assembly of the invention prevents fluid infiltration through the turret-mounted half of the connector.

FIGS. 1 and 2 are side sectional views of a multichannel fiber optic connector including a seal assembly, shown generally at 10, in accordance with the invention. In FIG. 1, the connector is shown fully coupled while FIG. 2 shows a vessel-mounted connector that has become decoupled for illustrating the potential fluid infiltration paths thereby exposed. The seal assembly 10 is illustrated engaged to a two-member connector of the type taught and described in pending United States patent application filed under attorney Docket No. L-357 covering "Fiber optic Connector". Each member of the connector is individually housed, one member being housed within a male housing or plug 14 and the other member housed within a female housing or receptacle 16.

When coupled as shown in FIG. 1, the ferrule-tipped ends 18, 18' of optical fibers 20, 20' received within internal channels of the connector abut one another to provide simultaneous multiple optical quality interconnections. The details and operation of an optical connector of this type are generally disclosed and discussed in U.S. Pat. No. 5,590,229 in addition to the above-referenced pending patent application.

The manner in which the connector is fixed to a vessel in use is shown in FIG. 2. As seen, the receptacle 16 is fitted to the turret 22 of the hull penetrator of the vessel while the connector member housed within the plug 14 is engaged to the proximate end of a flexible optical cable 24 that houses a plurality of optical fibers. The two members of the connector are illustrated as disengaged in FIG. 2, an occurrence that can take place during use. While such unintended disengagement may have many sources, it is, in all cases, capable of posing major problems as it potentially exposes the interior channels of the vessel-mounted connector member to fluid infiltration.

Generally, the source of potential fluid infiltration through the connector lies along the path of the representative optical fiber 20 through the connector member housed within the receptacle 16. In contrast, a channel 26 for receiving an exterior dowel 28 is reliably sealed by the press-fit relationship between the dowel 28 and the channel 26. Two such external dowels are provided in the connector members for resistance to torquing.

The rear end of the receptacle 16 includes a central aperture 30 for receiving the optical fibers 20, 32 (shown as representative of a much larger plurality of fibers). Such fibers are physically connected to such elements of the optical sensing system as a laser source, photodetector and couplers (not shown). A back plate 34 is held to a body member 36 at the rear of the connector member housed within the receptacle 16 by means of a screw 38. A representative aperture 40 within the back plate 34 is provided for access of the fiber 20.

In contrast to seals according to the prior art, the seal assembly 10 of the invention comprises a simple, multipart structure generally comprising a retainer member 44, a cover plate 46 and a standoff spacer 48, each of which is enclosed within a seal housing 50.

In the prior art, a chamber 42 within a seal housing was filled with an appropriate material, such as EPOXY, to prevent the spread of fluid within the vessel upon disengagement of the connector members as shown in FIG. 2. Unfortunately, the performance of such a seal is material-dependent. Further, while simple in concept, careful preparation of the interior surfaces of the seal housing 42 is required to assure adhesion in the presence of strong fluid infiltration forces. Finally, the use of such a seal makes subsequent replacement of optical fibers essentially impossible.

Returning to the invention, the retainer member 44 comprises a block-like structure that is firmly lodged against an annular shoulder 52 of the seal housing 50. A plurality of optical fiber channels, two of which are visible at 54, 54', pass through the retainer member 44. The optical fiber channels 54, 54' form pathways for the optical fibers 20, 32, respectively, between the chamber 42 and a chamber 56 defined by the member 44, the housing 50 and a strain relief plug 58. The open chambers 42, 56 provided by the seal assembly 10 allow the optical fibers 20, 32 to be somewhat slack therein to thereby minimize the chance of fiber breakage throughout the system. The fibers 20, 32 exit the rear of the seal assembly 10 through channels 20', 32' within the strain relief plug 58.

An O-ring 60 is seated within an annular channel 62 of the seal housing 50. The O-ring 60 provides a firm and watertight seal between the seal housing 50 and the interior of the receptacle 16. An O-ring 64 is seated within an annular channel 66 of the retainer member 44 for providing a watertight seal between the member 44 and the interior of the seal housing 50. O-rings 68, 70 are seated within recesses 72, 74 respectively in the front surface of the member 44. The recesses 72, 74 are aligned with apertures 72', 74' in the cover plate 46. Thus, the fibers 20, 32 pass through the channels 54, 54', the recesses 74, 72 and the apertures 74', 72' when interconnecting the chambers 42 and 56. The O-rings 68 and 70 provide firm and watertight seals around the optical fiber 20 and 32 along this potential water infiltration path through the connector.

The retainer member 44 further includes (three threaded) bores 76 adjacent the peripheral region thereof. Each bore 76 is equidistantly spaced, extending partially into the retainer member 44.

The cover plate 46 is flush-mounted against the front of the retainer member 44. Its diameter is slightly less than that of the member 44. A bracket aperture 78 within the cover plate 46 is aligned with the threaded bore 76 within the member 44 for passage therethrough and for interconnection of the standoff spacer 48.

The standoff spacer 48 comprises a cylindrical elongate member that extends between the cover plate 46 and the back plate 34 of the connector member. It insures the integrity of the hollow internal chamber 42. Furthermore the spacer 48 firmly wedges the retainer member 44 against the annular shoulder 52 of the seal housing 50. It comprises a solid central portion 80 that terminates at either end in hollow, internally threaded portions 82, 84.

The standoff spacer 48 is fixed in position between the parallel back and cover plates 34 and 46 by means of (1) a threaded bracket 86 for engaging the internally threaded portion 84 adjacent the cover plate 46 and (2) a bolt 88 for engaging the threaded portion 82 adjacent the back plate 34. The bracket 86 is inserted into the bracket aperture 78 in the cover plate 46, then threadedly engaged to the retainer member 44 at the threaded bore 76. It is of sufficient length so that, when fully inserted within the threaded bore 76, it extends a short distance beyond the cover plate 46. The threaded portion 84 of the spacer 80 is then engaged to the portion of the bracket 86 that extends beyond the cover plate 46. The threaded portion 82 is then secured to the back plate 34 by means of the bolt 88. The bolt 88 extends through an aperture 90 in the back plate 34 to engage the threaded portion 82 of the spacer 48.

The housing seal assembly of the invention adds significant strength and integrity to a multichannel fiber optic connector. As mentioned, the pathways of the optical fibers through an optical connector of the type referred to herein are very susceptible to water penetration. The seal assembly protects such potential infiltration paths by providing, inter alia, O-ring seals firmly held in place at recesses within the cover plate 46.

Another susceptible area in the event of an unintended decoupling lies between the retainer member and the interior of the seal housing. In this instance, structural integrity is provided by the combination of the tight fit of the retainer member within the seal housing and the provision of the sealing O-ring 64. Thus, while some infiltration through the channels containing ferrules may occur, numerous structures act to contain such leakage and thereby prevent catastrophic loss. The connector, including the seal assembly, is commonly employed at substantial depths. By concentrating on those points most susceptible to damage or destruction, it provides a sealing mechanism able to withstand pressures as high as 3,000 p.s.i.

The seal is constructed to be highly resistant to damage and destruction due to water and pressure and is process independent. Little or no consideration need be given to material shelf-life, the mixing of materials, surface preparation, cleanness of surfaces and operation properties and characteristics. Prior art seals have been largely process dependent, wherein their integrity and ability to function are depend upon some or all of the characteristics mentioned above. In contrast, the seal assembly can be constructed of any material possessing properties that allow it to withstand the rigors and pressures to which the connector may be subjected. Typically, the various seal components will comprise stainless steel or an alloy such as that commercially available under the trademark "K-MONEL".

An additional advantage of the invention resides in its conduciveness to ready maintenance and repair. Ease of access to the optical fibers is provided so that any reworking or repair that may be necessary can be achieved without discarding all, or substantial subassemblies, of the connector.

While this invention has been described with reference to its presently preferred embodiment, it is not limited thereto. Rather, this invention is only limited insofar as defined by the following set of patent claims and includes within its scope all equivalents thereof.

What is claimed is:

1. A seal for protecting a first optical fiber connector member of a two-part connector from fluid infiltration, said connector member being of the type that includes (i) a body element having a plurality of internal channels, (ii) a back plate adjacent the rear surface of said body element having a plurality of apertures aligned with said channels and (iii) being located within a longitudinally-symmetrical hollow connector housing having a rear aperture, said seal comprising, in combination:

a) a longitudinally-symmetrical seal housing having opposed first and second open ends, said housing being located within, distinct from and coaxial with said hollow connector housing, said back plate being flush with, and thereby substantially closing, said first open end of said seal housing;

b) a retainer member having opposed planar surfaces and a plurality of channels therethrough, said retainer member being located internal to and intermediate said open ends of said seal housing transverse to said common axis of symmetry of said housings;

c) a cover plate having a plurality of apertures aligned with said corresponding plurality of channels said retainer member, said cover plate being flush-mounted to the surface of said retainer member facing said first open end of said seal housing;

d) at least one elongated spacer member extending between said cover plate and said back plate to define a first chamber therebetween; and e) a plug having a plurality of apertures, said plug being fixed to and thereby closing said second open end of said seal housing to form a second chamber in substantial alignment with said first chamber.

2. A seal as defined in claim 1 further including an O-ring seated within a circular recess adjacent a terminal end of said channel through said retainer member.

3. A seal as defined in claim 2 wherein said recess and O-ring are located within the planar surface of said retainer member adjacent said cover plate.

4. A seal as defined in claim 3 wherein said aperture in said cover plate is smaller than said O-ring recess, said O-ring being located within said annular O-ring recess between said cover plate and said retainer member.

5. A seal as defined in claim 1 wherein said spacer comprises an elongate cylindrical body having opposed, interiorly threaded ends, a first end being bolted to said cover plate and a second end being bolted to said back plate.

6. A seal as defined in claim 1 wherein three spacers are equiangularly arranged for spacing said retainer member and said back plate.

7. A seal as defined in claim 1 wherein the back plate has an aperture therein through which a bolt extends for affixing said spacer to said back plate.

8. A seal as defined in claim 1 further including:

a) a bracket member;

b) one end of said bracket member being threadedly engaged to said retainer member and the opposed end of said bracket member being engaged to said spacer member; and c) said bracket member passing through an aperture in said cover plate so that said cover plate is located intermediate said retainer member and the spacer member.

9. A connector seal assembly for protecting a connector member of the type that includes an elongated symmetrical connector housing and a body element and a back plate mounted flush thereto, said seal assembly comprising, in combination:
   a) an elongated symmetrical seal housing coaxial with said connector housing having opposed first and second open ends, said fist open end of said seal housing being flush with said back plate to thereby substantially close said first end of said seal housing;
   b) a retainer member having front and rear walls and a plurality of optical fiber channels, said retainer member being received within said seal housing intermediate said first and second ends thereof;
   c) a cover plate having a plurality of apertures each corresponding to an optical fiber channel, said cover plate being flush-mounted on the front wall of said retainer member facing said first end of said seal housing; and
   d) an elongated spacer member extending between said cover plate of said seal and said back plate of said connector to define a first chamber therebetween; and
   e) a plug having a plurality of spertures, said plug being fixed to and thereby substantially closing said second open end of said seal housing to form a second chamber in substantial alignment with said first chamber.

10. A seal assembly as defined in claim 9 wherein:
    a) said retainer member is cylindrical in shape and has a side wall between said front and rear walls;
    b) said side wall having an annular O-ring channel therein; and
    c) an O-ring being seated in said O-ring channel to provide a tight seal with said seal housing.

11. A seal assembly as defined in claim 9 wherein:
    a) said retainer member has an annular O-ring recess associated with each optical fiber channel; and
    b) said annular O-ring recess being located in the front wall and receiving an O-ring for sealing about an optical fiber.

12. A seal assembly as defined in claim 11 wherein:
    a) said aperture in said cover plate is smaller than said annular O-ring recess; and
    b) said O-ring being sandwiched in said annular O-ring recess between said cover plate and said retainer member.

13. A seal assembly as defined in claim 9 wherein:
    a) said spacer is an elongate cylindrical body having first and second hollow ends; and
    b) said first hollow end is bolted to said retainer member and cover plate; and
    c) said second hollow end is bolted to said back plate.

14. A seal assembly as defined in claim 9 wherein three equidistant spacers are provided between said retainer member and said back plate.

15. A seal assembly as defined in claim 9 wherein a chamber is defined between said cover plate and said body element, said chamber forming a strain relief for said optical fibers.

16. A seal assembly as defined in claim 9 wherein said body element has a back plate having a bolt aperture therein through which a bolt extends whereby said spacer is affixed to said back plate.

17. A seal housing as defined in claim 9 further including:
    a) a bracket member;
    b) one end of said bracket member being threadedly connected to said retainer member and another end of said bracket member being attached to said spacer member; and
    c) said bracket member passing through an aperture in said cover plate so that said cover plate is located intermediate said retainer member and said spacer member.

* * * * *